US007146802B2

United States Patent
(12) United States Patent
Lee

(10) Patent No.: US 7,146,802 B2
(45) Date of Patent: Dec. 12, 2006

(54) REDUCING $NO_X$ EMISSIONS WITH A STAGED CATALYST

(75) Inventor: Jong-Hwan Lee, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 14 days.

(21) Appl. No.: 10/960,860

(22) Filed: Oct. 7, 2004

(65) Prior Publication Data

US 2006/0075742 A1 Apr. 13, 2006

(51) Int. Cl.
*F01N 3/00* (2006.01)

(52) U.S. Cl. ............................ 60/286; 60/274; 60/97; 60/301; 422/170; 422/171; 422/172; 422/177; 423/213.2; 423/239.1

(58) Field of Classification Search ................ 60/274, 60/286, 295, 297, 301, 303; 422/169, 170, 422/171, 172, 177; 423/213.2, 213.5, 239.1
See application file for complete search history.

(56) References Cited

U.S. PATENT DOCUMENTS 5,645,804 A * 7/1997 Sumiya et al. ........... 423/239.1
6,192,675 B1 * 2/2001 Hirota et al. ................. 60/286
6,581,374 B1 * 6/2003 Patchett et al. ............... 60/286
6,823,663 B1 * 11/2004 Hammerle et al. ........... 60/286
6,877,313 B1 * 4/2005 Phillips et al. ................ 60/297
6,912,847 B1 * 7/2005 Deeba ......................... 60/297
2003/0115859 A1 6/2003 Deeba ......................... 60/297
2004/0098868 A1 5/2004 Hammerle et al. ........... 60/295

OTHER PUBLICATIONS

PCT/US05/35108 International Search Report dated May 12, 2006.

* cited by examiner

*Primary Examiner*—Binh Q. Tran
(74) *Attorney, Agent, or Firm*—Kathryn A. Marra

(57) ABSTRACT

The conversion of $NO_x$ to nitrogen in the exhaust of a lean burn engine using a hydrocarbon assisted-selective catalytic reduction system is benefited by a two-stage oxidation catalyst-reduction catalyst SCR reactor. The character and quantity of the oxidation catalyst is managed to just activate the hydrocarbon reductant at low temperatures (but not fully burn it at high temperatures) to increase its $NO_x$ reduction efficiency as the exhaust then contacts the larger reduction catalyst stage of the two-stage reactor.

12 Claims, 2 Drawing Sheets

10
16
12
18
14

REDUCING $NO_X$ EMISSIONS WITH A STAGED CATALYST

TECHNICAL FIELD

This invention pertains to the treatment of exhaust gas from lean burn gasoline and diesel engines to convert nitrogen oxides ($NO_x$) to nitrogen. More specifically this invention pertains to hydrocarbon assisted, selective catalytic reduction of nitrogen oxides in the oxygen-rich exhaust using a two stage, upstream-downstream, oxidation-reduction catalytic reactor.

BACKGROUND OF THE INVENTION

Lean burn gasoline and diesel engines are operated at higher than stoichiometric air-to-fuel (A/F) mass ratios for improved fuel economy. Such lean burn engines produce a hot exhaust with a relatively high content of oxygen and nitrogen oxides ($NO_x$). The temperature of the exhaust from a warmed up diesel engine is typically in the range of 200° to 400° C. and has a representative composition, by volume, of about 10–17% oxygen, 3% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content and the water content in the hot exhaust stream.

Because the engine-out hydrocarbons in the diesel engine exhaust are not effective in reducing $NO_x$, it has been proposed to add gaseous or vaporizable substances such as ammonia or urea to the oxygen-rich exhaust gas to provide reactants for the conversion of $NO_x$ over a suitable catalyst. The practice is termed selective catalytic reduction of $NO_x$ (SCR) and catalysts such as certain base metal-exchanged zeolite catalysts have been tested to accomplish this difficult chemical reduction task.

The use of diesel fuel or gasoline constituents as the reductant for $NO_x$ is viewed favorably, particularly for vehicle applications, because these fuel component hydrocarbons are stored on-board and a small portion can be diverted for injection into the exhaust gas stream. However, both the engine-out and fuel component hydrocarbons tend to be less reactive and less selective reductants for $NO_x$ than ammonia or urea resulting in a higher light-off temperature and undesired hydrocarbon combustion (total oxidation). In hydrocarbon-assisted SCR, ethyl alcohol is viewed as having utility like a hydrocarbon because it can be converted in the exhaust to chemical species useful in the reduction of $NO_x$. Ethyl alcohol can be delivered as a fuel additive, and, if desired, easily distilled off from the fuel and stored in a separate tank on a vehicle.

It is, thus, an object of the present invention to provide an improved method of practicing hydrocarbon-assisted SCR in such oxygen-rich, nitrogen oxide containing mixtures. It is a more specific object of the present invention to provide a two-stage catalytic reactor for successive activation (without total oxidation) of hydrocarbon content in the exhaust and reduction of $NO_x$ constituents using different catalysts placed, respectively, in upstream and downstream stages of the reactor.

SUMMARY OF THE INVENTION

In the operation of a lean burn gasoline or diesel engine the mass air-to-fuel (A/F) ratio is typically in excess of 17. The exhaust gas of a warmed-up lean-burn engine has a lower carbon monoxide content and unburned hydrocarbon content than an engine operated at stoichiometric A/F. The exhaust of a diesel engine typically contains particulate matter comprising hydrocarbons (HC) deposited on a carbon core. It may be preferred to remove such particulates or convert them to gaseous $CO_2$ before treatment of $NO_x$ in accordance with this invention. And it may be preferred to add a small amount of a fuel component hydrocarbon or ethyl alcohol to the exhaust to assure sufficient reductant species for conversion of the $NO_x$ constituents.

Two major competing reactions are involved in hydrocarbon-assisted SCR of $NO_x$ in lean engine exhaust: hydrocarbon oxidation and $NO_x$, (primarily NO) reduction. Each reaction involves intermediate steps including initial conversion of NO and HC to more reactive species. The traditional method of improving the performance of an SCR catalyst has been the addition of promoters to the reduction catalyst composition to enhance certain reaction steps. For example, a catalytic component can be added to promote the HC oxidation reaction to decrease its light off temperature. However, this often leads to the enhancement of the total oxidation (combustion) of HC species at high temperatures, thereby limiting the availability of HC for $NO_x$ reduction at high temperatures.

In accordance with the subject invention, a staged catalyst system is used. An oxidation catalyst is placed upstream of a suitable reduction catalyst in the flow of the exhaust stream. The oxidation catalyst can be made of any material of high oxidation activity, but must be used at a suitably high space velocity to avoid total oxidation of the hydrocarbon content of the exhaust at high temperatures. Platinum, palladium and rhodium are examples of suitable oxidation catalysts. The oxidation catalyst activates the C—H and/or C—C bonds of the hydrocarbon reductant, and generates oxygenated and/or alkene species which can reduce NO more effectively, and also provides some heat, which helps the faster warm-up of the SCR catalyst. Immediately downstream of this oxidation catalyst is the catalyst for selective reduction of nitrogen oxides. Certain base metal-exchanged zeolites, and silver dispersed on high surface area alumina, are examples of suitable catalysts for SCR. By way of example, the quantity of effective oxidation catalyst surface may be about one-tenth of the reduction catalyst surface.

When a suitable balance of oxidation catalyst in front of (i.e., upstream) the reduction catalyst is employed the hydrocarbon reductant is activated at relatively low exhaust temperatures and starts to effectively promote conversion of NO and $NO_2$ to nitrogen. The higher space velocity of the exhaust in contact with the oxidation catalyst avoids or minimizes combustion of the hydrocarbon content at high temperatures, and thus widens the effective operating temperature of the HC/SCR system.

Therefore, the $NO_x$-containing exhaust with suitable HC reductant content is passed through a dual-stage oxidation catalyst-reduction catalyst reactor. The oxidation catalyst stage promotes activation of the reductant species even while the engine is warming up and the catalytic reduction stage is effective over a wider range of exhaust temperatures.

Other objects and advantages of the invention will become more apparent from a detailed description of preferred embodiments with follows.

DESCRIPTION OF THE PREFERRED EMBODIMENT

The process of this invention is for hydrocarbon enhanced SCR of the $NO_x$ content of exhaust from a lean-burn internal combustion engine. In the case of some above-stoichiometric A/F engines, such as diesel engines, it may be preferred to remove particulate matter from the exhaust to prepare the exhaust for the two-stage catalytic process of this invention. If the amount of engine-out hydrocarbons is deficient for the reduction of $NO_x$, hydrocarbon gasses, such as from a fuel storage, may be added to the exhaust stream as indicated in FIG. 1 to assure sufficient HC content for the SCR conversion of $NO_x$ in accordance with this invention.

Figure 1:
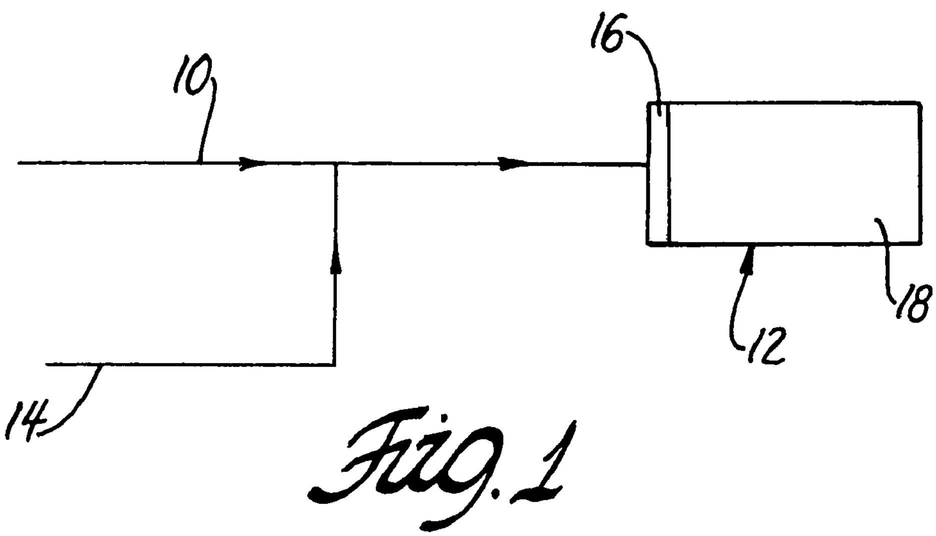
FIG. 1 is a schematic flow diagram for treatment of the exhaust from a lean-burn, hydrocarbon fuel internal combustion engine using a two-stage hydrocarbon-assisted selective catalyst system for reduction of $NO_x$.

In FIG. 1, exhaust stream 10 from a lean-burn engine, not shown, is directed to a dual-stage oxidation-reduction catalytic reactor 12. In applications in which the engine is operated at a relatively high air-to-fuel mass ratio the hydrocarbon content of the exhaust may be lower than is suitable for enhancing catalytic reduction of $NO_x$. Accordingly, a supplemental amount of hydrocarbon gas or vapor may be added to exhaust stream 10 as indicated by side-stream 14 in FIG. 1. Exhaust gas analyses may be conducted on engines of a particular design with specified fuels to determine representative exhaust gas compositions in representative modes of operation of the engine. When the hydrocarbon content is insufficient for $NO_x$ reduction in accordance with this invention, additional diesel fuel or gasoline, depending upon the engine, may be added to exhaust stream 10. Ethyl alcohol or the like can be carried on a vehicle separate from the fuel tank, and used as a hydrocarbon addition for this purpose.

Two stage catalytic reactor 12 has an upstream oxidation catalyst stage 16 and a separate, larger downstream reduction reactor stage 18. As stated, the oxidation reactor section is used to activate the hydrocarbon content of exhaust stream 10 by converting the typically aliphatic hydrocarbons to oxygen-containing and/or alkene species that are more effective for the reduction of NO and $NO_2$ to $N_2$, and to provide heat for the downstream SCR catalyst by oxidizing fuel. The composition of the oxidation catalyst and the space velocity of stream 10 through the catalyst bed 16 are specified so that activation of the hydrocarbon content is maximized at low temperatures and combustion of hydrocarbons to carbon dioxide and water is minimized at high temperatures. The composition and size of the reduction reactor stage is to maximize conversion of $NO_x$ to nitrogen.

A practice of the invention will be described in terms of experimental work in which the oxidation catalyst is illustrated by the use of palladium dispersed on high surface area gamma-alumina and the SCR catalyst is silver dispersed as fine particles on a like high surface area alumina.

$Ag/Al_2O_3$ containing 2 wt. % Ag was prepared on $\gamma$-$Al_2O_3$ powder (Sasol, Catalox SBa-200) by the incipient wetness method using $AgNO_3$ (JT Baker) as a precursor. The catalyst was dried at 110° C. overnight and calcined at 500° C. for 4 h.

$Pd/Al_2O_3$ containing 0.7 wt. % Pd was prepared also on $\gamma$-$Al_2O_3$ powder (Sasol, Catalox SBa-200) by the same method using an aqueous $Pd(NO_3)_2$ solution (Research Inorganic Chemicals). The catalyst was also dried at 110° C. overnight and calcined at 500° C. for 4 h.

Both catalysts were analyzed for the actual metal content by Inductively Coupled Plasma-Atomic Emission Spectroscopy (ICP-AES) using a Perkin-Elmer Optima 300 instrument.

All the experiments were conducted in a micro reactor system. Catalyst samples of 60–80 mesh screen sizes were loaded in a ⅜" OD quartz tube, which was placed in an electric furnace. The reaction temperature was measured by a thermocouple located slightly above the upstream catalyst bed in the inlet. Unless specified otherwise, the activity was measured using a feed gas containing 500 ppm NO, 15% $O_2$, 10% $H_2O$, 1200 ppm $C_2H_5OH$ and balance He. Helium was used in place of nitrogen as the largest constituent of the simulated exhaust to simplify analysis of nitrogen formed in the two-stage reactor. Pure water and liquid hydrocarbons were injected in the same manner using separate sets of a syringe pump and a wick. The injected liquids were then evaporated and heated along with the gas lines to over 120° C. The total gas flow rate was 272 ml/min at standard conditions, and the gas hourly space velocity was varied by using different catalyst amounts. The pressure inside the system was regulated at 940 Torr, and all the gas flow was directed to the analytical instruments. The concentrations of reactants and products were measured by a Nicolet Nexus 670 infrared spectrometer (FT-IR) and an Agilent 6890 gas chromatographer with an Agilent 5973 mass spectrometer (GC-MC).

The catalysts were evaluated for their activity toward hydrocarbon conversion, $NO_x$ conversion and $N_2$ formation. The conversions of ethanol and $NO_x$ were calculated based on the difference in its concentration before and during the reaction. On the other hand, $N_2$ formation was defined as the amount of $N_2$ produced divided by the amount of $NO_x$ in the feed gas.

It is known that compared to metal oxides, metals are more active in breaking the C—H and C—C bonds of hydrocarbon molecules, and thus the hydrocarbon oxidation reaction can occur over metal-based catalysts at lower temperatures. For this reason, small quantities of platinum group metals (i.e., Pt, Pd and Rh), which are excellent oxidation catalysts, have been added to (i.e., mixed intimately and uniformly with) various HC-SCR catalysts to help lower the light-off temperature. However, the addition of these highly oxidizing catalysts has often resulted in total combustion of hydrocarbons, and thus limits the $NO_x$ reduction at high temperatures.

Therefore, this invention employs a staged HC-SCR system using an oxidation catalyst in front of an SCR catalyst as shown in FIG. 1. The exhaust encounters the two stages in a continuous flow sequence. The activation of hydrocarbons (i.e., breaking of C—H and C—C bonds) is achieved at lower temperatures by this pre-oxidation catalyst that is concentrated in the front part of the catalyst bed. The total oxidation of hydrocarbons is avoided or minimized at high catalyst temperatures by using only a very small amount of the oxidation catalyst in the first stage of the reduction reactor. The fast oxidation reaction can be managed and limited under high space velocity conditions.

A series of experiments were conducted in order to discern the effect of a two stage reactor of this invention.

As a first SCR catalyst system, a plain $Ag/Al_2O_3$ catalyst (denoted as Ag in the following figures), prepared as described above was used.

As a second SCR system, a two stage reactor was prepared in accordance with an embodiment of this invention. The larger and downstream catalyst bed was $Ag/Al_2O_3$. The short upstream catalyst bed was prepared by placing the Pd/alumina catalyst, which was mixed with silica gel to avoid channeling of the exhaust gas, in front of the Ag on alumina sample, thus denoted as Pd/Ag.

In order to simulate the Pd-promoted catalyst, a physical mixture of the $Pd/Al_2O_3$ and the $Ag/Al_2O_3$ samples was prepared and denoted as Pd+Ag. Although the dispersion of Pd particles must be lower in this mixture compared to samples normally prepared by the impregnation of precursors on alumina, similar promotional effect of Pd would be obtained.

These three catalyst beds (i.e., Ag, Pd+Ag, Pd/Ag) were compared under the identical conditions for ethanol conversion, $NO_x$ reduction and $N_2$ formation. The space velocity was fixed at 100 k $h^{-1}$ for the Ag catalyst in each system to see the effect of Pd.

Figure 2:
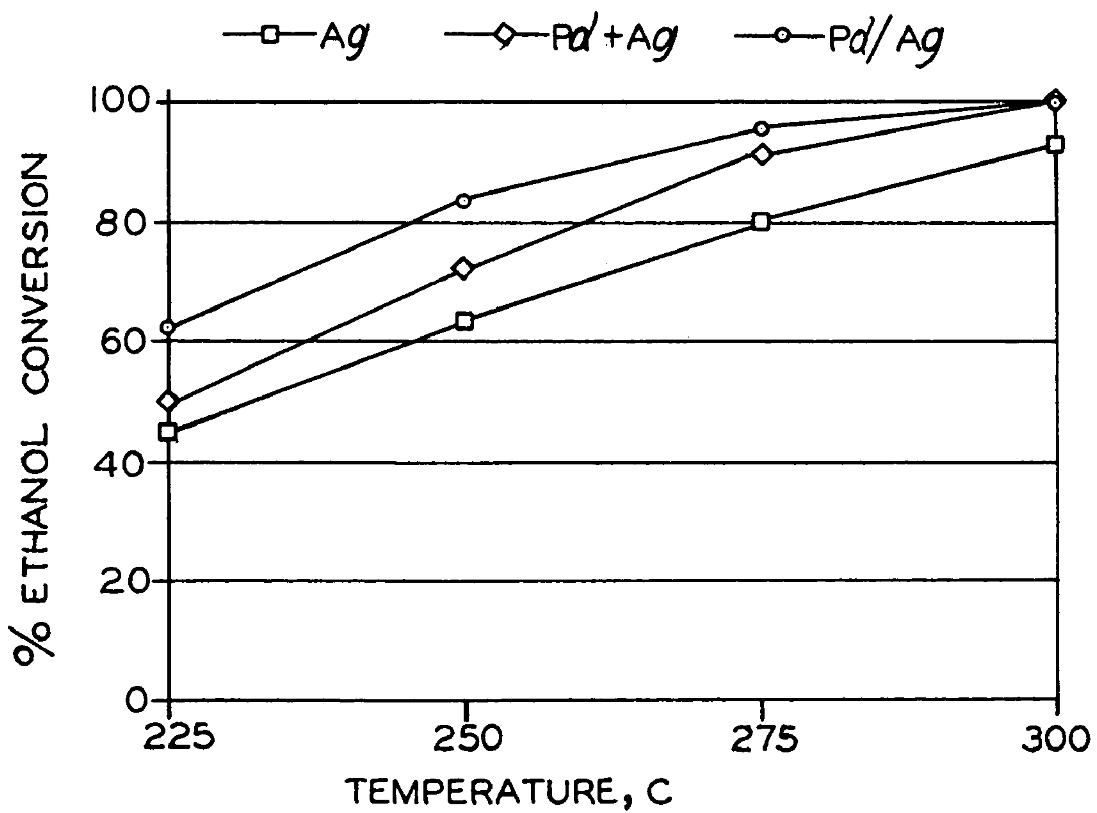
FIG. 2 is a graph of percent ethanol conversion versus catalyst inlet temperature for a Pd/Ag two-stage reactor in accordance with this invention, and for comparative Ag and Pd+Ag catalytic reactors for $NO_x$ conversion.
Figure 3:
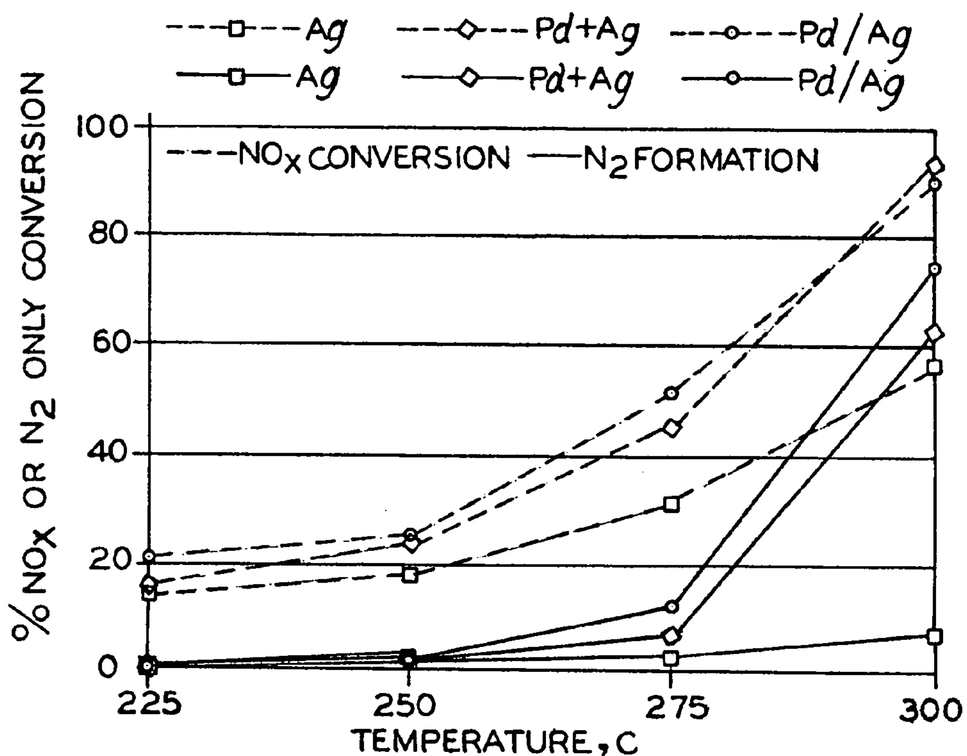
FIG. 3 is a graph of percent $NO_x$ conversion (broken line data) and percent $N_2$ formation (solid line data) versus catalyst inlet temperature for a Pd/Ag two-stage reactor in accordance with this invention, and for comparative Ag and Pd+Ag catalytic reactors for $NO_x$ conversion.

As shown in FIG. 2, the ethanol conversion was improved at low temperatures with Pd catalyst. For example, the ethanol conversion at 225° C. was improved from 45% over the Ag to 49% over the Pd+Ag and to 62% over the Pd/Ag samples. Both the $NO_x$ conversion (broken line in FIG. 3) and $N_2$ formation (solid line) were improved at all temperatures as shown in FIG. 3, although significant enhancement was observed at above 250° C. for the $NO_x$ conversion and 275° C. for $N_2$ formation. As expected, the light-off temperatures for ethanol and $NO_x$ conversions were all lowered with the use of Pd catalyst.

Figure 4:
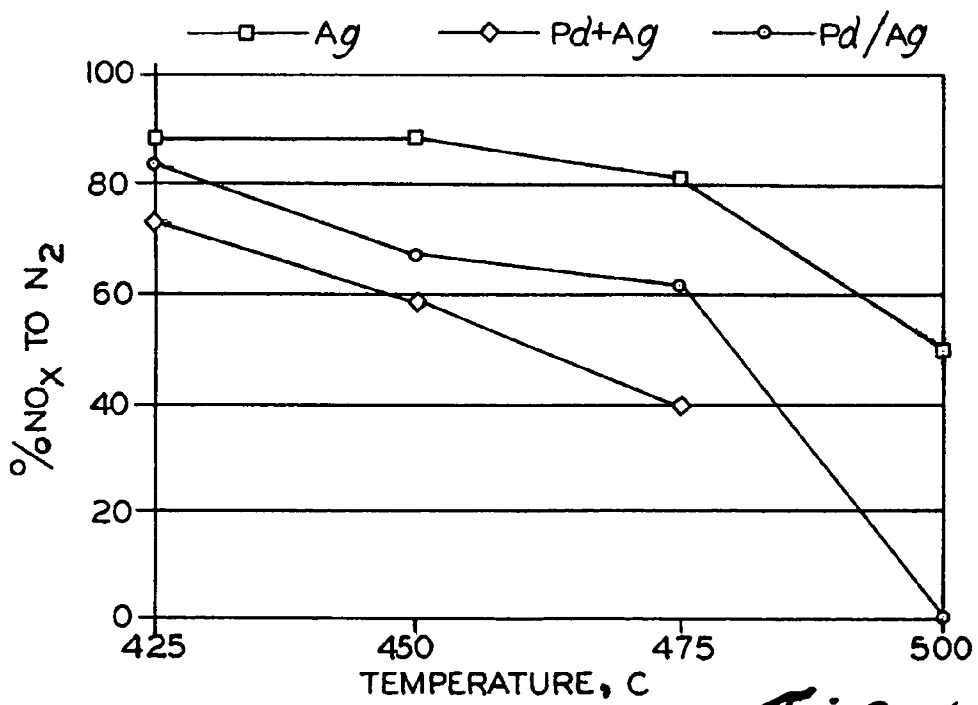
FIG. 4 is a graph of percent conversion of $NO_x$ to $N_2$ versus catalyst inlet temperature for a Pd/Ag two-stage reactor in accordance with this invention, and for comparative Ag and Pd+Ag catalytic reactors for $NO_x$ conversion.

At higher temperatures, as shown in FIG. 4, $N_2$ formation was suppressed over the Pd+Ag and Pd/Ag samples because of the ethanol combustion, which results in the shortage of reductant. However, as expected, the $N_2$ formation was suppressed to the lesser extent over the Pd/Ag sample compared to the Pd+Ag sample. At higher exhaust temperatures or higher catalyst temperatures it may be preferred to increase the hydrocarbon content of the exhaust to compensate for the likelihood of higher HC combustion in the oxidation stage.

Therefore, it was concluded that, through a staged HC-SCR system using a pre-oxidation catalyst under high space velocity conditions, the hydrocarbons oxidation over the downstream HC-SCR catalyst can be improved at lower temperatures, but the total oxidation can be limited at higher temperatures. The amount of pre-oxidation catalyst must be optimized to ensure the benefits at both ends of the operating temperature window. This concept of using a pre-oxidation catalyst can be applied to widen the temperature window of other HC-SCR catalyst system.

The invention has been described in terms of certain experimental examples that demonstrate its effectiveness. However, it is to be understood that other combinations of hydrocarbon reductants and hydrocarbon activation catalysts as well as SCR catalysts may be used. Accordingly the scope of the invention is to be considered limited only by the following claims.

The invention claimed is:

1. A method of converting $NO_x$ content of the exhaust gas of a lean-bum engine to nitrogen where the exhaust comprises NO and $NO_2$, the method comprising:

passing the exhaust through a catalytic reactor comprising an upstream stage of an oxidation catalyst for the hydrocarbon content of the exhaust and an adjacent, but separate, downstream stage of a reduction catalyst for $NO_x$ and the reaction product of the first reactor stage, the space velocity of the exhaust gas with respect to said upstream stage being sufficiently high so as to activate the hydrocarbon content of the exhaust without consuming it by combustion.

2. The method as recited in claim 1 comprising increasing the hydrocarbon content of the exhaust before the exhaust enters the catalytic reactor.

3. The method as recited in claim 2 comprising increasing the hydrocarbon content of the exhaust at catalytic reactor temperatures in excess of 425° C.

4. The method as recited in claim 1 in which the upstream stage catalyst comprises one or more platinum group elements selected from the group consisting of platinum, palladium and rhodium dispersed as particles on alumina.

5. The method as recited in claim 1 in which the downstream stage catalyst comprises silver dispersed as particles on alumina.

6. The method as recited in claim 1 in which the space velocity of the exhaust stream contacting the oxidation catalyst stage is at least ten times the space velocity of the stream contacting the reduction catalyst stage.

7. The method as recited in claim 1 in which the temperature of the exhaust gas entering the catalytic reactor is at least 200° C.

8. The method as recited in claim 2 in which the hydrocarbon content of the exhaust of a diesel engine is increased by adding diesel fuel to the exhaust.

9. The method as recited in claim 2 in which the hydrocarbon content of the exhaust of a gasoline-fuelled engine is increased by the addition gasoline hydrocarbons to the exhaust.

10. The method as recited in claim 2 in which the hydrocarbon content of the exhaust of a lean-burn engine is increased by the addition of ethanol to the exhaust.

11. The method as recited in claim 1 in which the downstream catalyst stage comprises a base metal substituted zeolite.

12. The method as recited in claim 2 comprising increasing the hydrocarbon content of the exhaust at exhaust gas temperatures in excess of 425° C.

* * * * *